United States Patent [19]

Schulte et al.

[11] 4,291,991

[45] Sep. 29, 1981

[54] APPARATUS FOR THE PREPARATION OF A REACTION MIXTURE FROM FLUID COMPONENTS

[75] Inventors: Klaus Schulte; Heinrich Ersfeld, both of Leverkusen, Fed. Rep. of Germany

[73] Assignee: Bayer Aktiengesellschaft, Leverkusen, Fed. Rep. of Germany

[21] Appl. No.: 66,748

[22] Filed: Aug. 15, 1979

[30] Foreign Application Priority Data

Aug. 28, 1978 [DE] Fed. Rep. of Germany ....... 2837424

[51] Int. Cl.³ .................... B01F 15/00; G05D 16/00
[52] U.S. Cl. ................................ 366/159; 422/105; 422/112; 422/113; 425/817 R; 264/DIG. 83
[58] Field of Search ............ 366/159, 134, 136; 422/105, 112, 113, 226; 425/4 R, 817 R; 264/37, DIG. 83; 137/625.4

[56] References Cited

U.S. PATENT DOCUMENTS

| | | | |
|---|---|---|---|
| 3,706,515 | 12/1972 | Keuerleber | 425/4 |
| 3,773,300 | 11/1973 | Hauser | 366/136 |
| 3,926,219 | 12/1975 | Ersfeld | 137/625.49 |
| 3,929,989 | 12/1975 | Althausen | 425/817 R |
| 3,960,506 | 6/1976 | Schmitzer | 137/625.4 |
| 3,975,128 | 8/1976 | Schlister | 425/207 |
| 3,982,870 | 9/1976 | Boden | 425/252 |
| 4,013,391 | 3/1977 | Boden | 425/145 |
| 4,019,652 | 4/1977 | Suh et al. | 222/1 |
| 4,105,045 | 8/1978 | Althausen | 137/563 |
| 4,106,115 | 8/1978 | Takshashi | 366/159 |
| 4,126,399 | 11/1978 | Schneider | 366/159 |
| 4,129,636 | 12/1978 | Boden | 264/51 |

FOREIGN PATENT DOCUMENTS

| | | |
|---|---|---|
| 836249 | 3/1952 | Fed. Rep. of Germany . |
| 1152532 | 8/1963 | Fed. Rep. of Germany . |
| 1903243 | 11/1971 | Fed. Rep. of Germany . |
| 2649602 | 5/1977 | Fed. Rep. of Germany . |

OTHER PUBLICATIONS

RIM urethanes get boost from new technique, for filling, reinforcement, Modern Plastics International, Sep. 1977, pp. 14-15.

*Primary Examiner*—Edward J. McCarthy
*Attorney, Agent, or Firm*—Gene Harsh; Joseph C. Gil

[57] ABSTRACT

The invention is directed to an apparatus for the preparation of a reaction mixture, from fluid components, comprising storage tanks, feed pipes leading from said storage tanks to a mixing head via metering pumps and opening into a mixing chamber via injection apertures, said mixing chamber formed by the bore of a housing, a control piston displaceable within said bore and being capable of blocking flow through said apertures, return lines branching off upstream of said apertures and leading up to said storage tanks, and a shut-off means for stopping the flow of said material through at least one of said return lines, the activation of said shut-off means being dependent upon the position of said control piston within said bore.

6 Claims, 2 Drawing Figures

APPARATUS FOR THE PREPARATION OF A REACTION MIXTURE FROM FLUID COMPONENTS

BACKGROUND OF THE INVENTION

This invention relates to an apparatus for the preparation of a reaction mixture, in particular one which forms a foam, from fluid components, consisting of storage tanks from which feed pipes lead through metering pumps to a mixing head and open into a mixing chamber through injection apertures. The mixing chamber is formed by the bore of a housing in which the control piston of a control device is displaceable, and return lines are provided in the system.

Apparatus of this type may be used for the preparation of reaction mixtures which give rise to cellular materials such as flexible, semi-rigid, rigid or structural foams (e.g. based on polyurethane or isocyanurate) or non-cellular materials such as elastomers.

The production of shaped products by the reaction of a mixture in a mold is becoming increasingly important, particularly in the automotive industry for the production of seat shells, dashboards, steering wheels, crash pads, bumpers and soft faces. Because of the volumes involved, it is essential to ensure satisfactory and troublefree operation.

The flow of the reactants from "circulation" to "mixing" and conversely during continuous operation entails considerable difficulties. Exactly synchronized entry of the various reactants, which may differ in their viscosities and quantitative rates of throughput, is of the greatest importance for obtaining perfect shaped products. Even the slightest racing ahead of one component produces faults in the finished product. Furthermore, the volumetric capacity of the mixing chamber must be adapted to the total quantitative throughput. In other words, relatively small rates of throughput (e.g. of less than 5 kg/min) require the use of very narrow mixing chambers. At the present time, there is no completely satisfactory apparatus on the market which will fulfill these requirements.

Some mixing heads are equipped with hydraulically operated needle circulation nozzles. Synchronized flow from circulation to mixing is effected by a hydraulic servo system. This entails certain sources of error such as air in the hydraulic system obstruction of a nozzle, and the like. Exact positive control is thus extremely difficult, if not impossible. The use of such nozzles also requires an additional driven ram for cleaning the mixing chamber. The whole construction is therefore quite complicated. Characteristic of these types of mixing heads are those described in U.S. Pat. Nos. 3,926,219 and 4,105,045.

Other mixing heads are known in which the flow from circulation to mixing of the components is effected by means of circulation grooves formed in the control pistons of a control device. Characteristic of these types of mixing heads are those described in U.S. Pat. Nos. 3,706,515, 3,975,128, 3,982,870, 4,129,636, and 4,013,391. These also have disadvantages. The pressure of the components is adjusted by nozzles. The pressure during circulation should be essentially the same as during mixing but this is difficult to achieve since the pressure losses in the circulation grooves and the pipes following are added to the pressures produced by the injection nozzles. Moreover, it is not possible to use small control piston diameters with these mix heads since the two circulation grooves must be separated from each other. The volume of the mixing chamber is therefore very restricted, especially for relatively small rates of throughput. When small diameters are used, the problem of providing an effective seal between the circulation grooves of the control piston for the various reactants becomes extremely difficult. Moreover, in the case of small circulation grooves there is a disproportionate increase in pressure when the system is switched to "circulation".

It is, therefore, an object of the present invention to produce an apparatus which provides exact positive control of the components, a simple method of control, great variability in the adjustment and construction of the volume of the mixing chamber (particularly for relatively small rates of output), and a simple and, if desired, independent and separate adaptation of the circulation pressure to the injection pressure.

DESCRIPTION OF THE INVENTION

Figure 1:
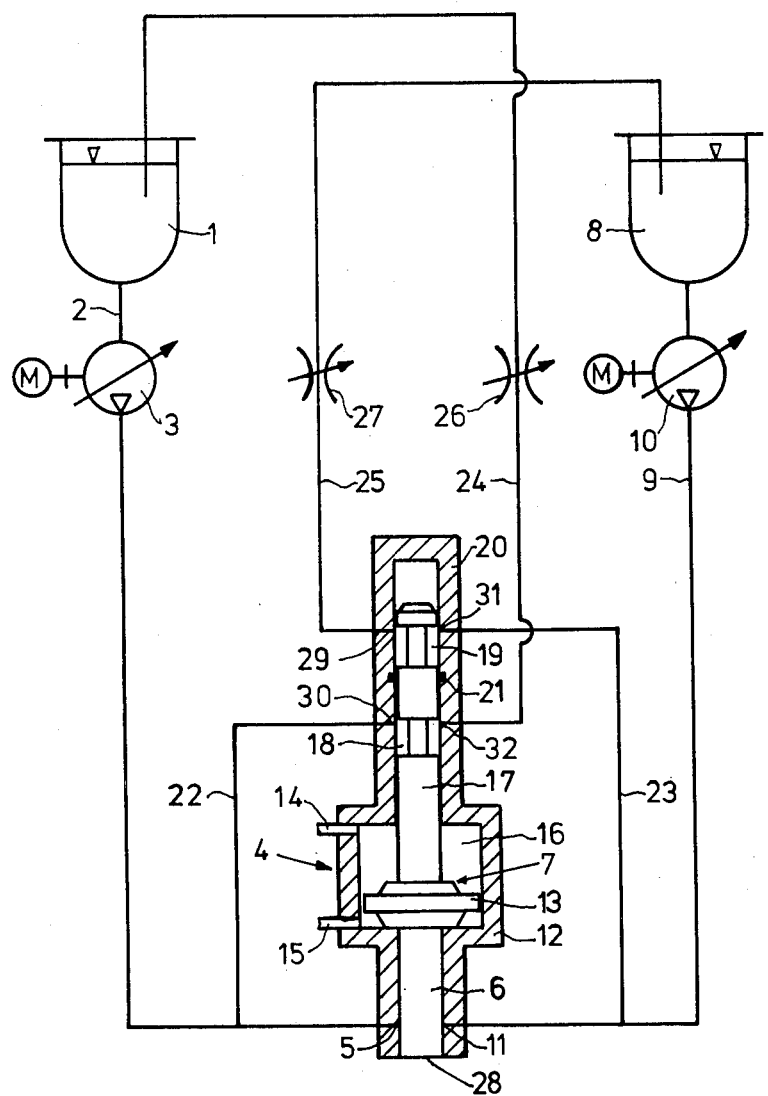
FIG. 1 represents an apparatus according to a first embodiment, in which the control device for the injection apertures and the shut-off device for the return lines form a single unit

To solve the above-noted problems, return lines are provided which branch off upstream of the injection apertures. A shut-off device which is connected to the control piston by way of a positive control, is provided in at least one of the return lines.

As a result of this arrangement, the positive control exactly synchronizes the flow from mixing to circulation and conversely with the opening and closing of the injection apertures. This considerably reduces the problem of sealing. The diameter of the mixing chamber and hence of the control piston can be greatly reduced so that a very small mixing chamber volume can be obtained.

According to one particular embodiment, the shut-off device is a rear extension of the control piston. This rear extension constitutes the positive control, and is displaceable in the housing. The return line passes through the part of the housing which encloses the extension and a channel provided on the rear extension. The channel is situated at such a distance from the leading edge of the control piston that the inflowing and outflowing sections of the return line are only connected in the position of rest.

The structural unit between the control piston and the shut-off device is particularly advantageous because no intermediate members are required. However, it is noted that fine adjustments are not generally possible with this embodiment.

In the alternative embodiment, a separate shut-off device provided with a control member is arranged in the return line. The positive control consists of an electronic proximity switch which is associated with the control piston and is connected to an impulse convertor which is connected to the control member. Although this embodiment is more complicated in construction, it improves accessibility and the possibility of servicing. A time delay element is preferably provided between the impulse convertor and the control member. Thus, if one of the reactants is much more viscous than the other, the less viscous component can be much more quickly accelerated and retarded at the changeover from circulation to mixing or conversely. In order to obtain synchronized entry of the components into the mixing chamber, the time delay element for the less viscous component can be adjusted so that the shut-off device is switched with the required delay.

Two embodiments of the apparatus according to the invention are represented schematically in the drawing and will be described below.

In FIG. 1, a storage tank 1 for the polyol component is connected to a mixing head 4 by a feed pipe 2 containing a metering pump 3. The feed pipe opens into a mixing chamber through an injection aperture 5. In the drawing, this mixing chamber is occupied by the control piston 6 of a hydraulic control device 7. A feed pipe 9 leads from a storage tank 8 containing the isocyanate component to the injection aperture 11 of the mixing head 4 by way of the metering pump 10. The control device 7 is displaceable in the housing 12 of the mixing head. Its hydraulic piston 13 is displaceable in a hydraulic chamber 16 which has inlet and outlet pipes 14,15. Attached to the hydraulic piston 13 on the side remote from the mixing chamber is a rear extension 17 in the form of a shaft which has two annular grooves forming channels 18,19. This extension 17 is displaceable in the extension 20 of the housing 12 of the mixing head. The extension has a seal 21 between the ranges of displacement of the channels 18,19. Return line sections 22,23 are branched off the feed pipes, 2,9 upstream of the injection apertures 5,11 and each opens into the range of displacement of one of the two channels 18,19. The return line sections 24,25 which contain restrictor valves 26,27 begin at the points opposite to the inlets of the sections 22,23 and end in the storage tanks 1,8. The stroke of the control device 7, the leading edge 28 of the control piston 6, the distance of the channels, 18,19 from this edge and the position of the openings 29,30 and the openings 31,32 are so adjusted to each other that when the injection apertures 5,11 are open, that is to say in the position of the control device 7 for "mixing", the channels 18,19 are outside the range of the openings 29,30 and the openings 31,32. When the control device 7 is in the position of rest (or circulation), on the other hand, the channels 18,19 connect the return line sections 22,24 and the sections 23,25.

The mode of operation of the apparatus shown in FIG. 1 is as follows: The control device 7 is in the position of rest, i.e. the control piston 6 closes the injection apertures 5,11. The metering pumps 3,10 pump the components from the storage tanks 1,8 through the feed pipes 2,9, the return line sections 22,23, the channels 18,19, the return line sections 24,25 and the restrictor valves 26,27, which are adjusted to 100 bar, back into the storage tanks 1,8. When hydraulic fluid is forced into the hydraulic chamber 16 through pipe 15, the control device 7 is shifted into the position for mixing. The injection apertures 5,11 are thereby released and the components enter the mixing chamber where they are mixed, and the resulting mixture is discharged into a mold (not shown). At the same time that the injection apertures 5,11 are released, the return line sections 22,24 and 23,25 are disconnected from each other by the rear extension 17. When the desired quantity of mixture has been produced, the control device 7 switches the system back to the position of rest.

Figure 2:
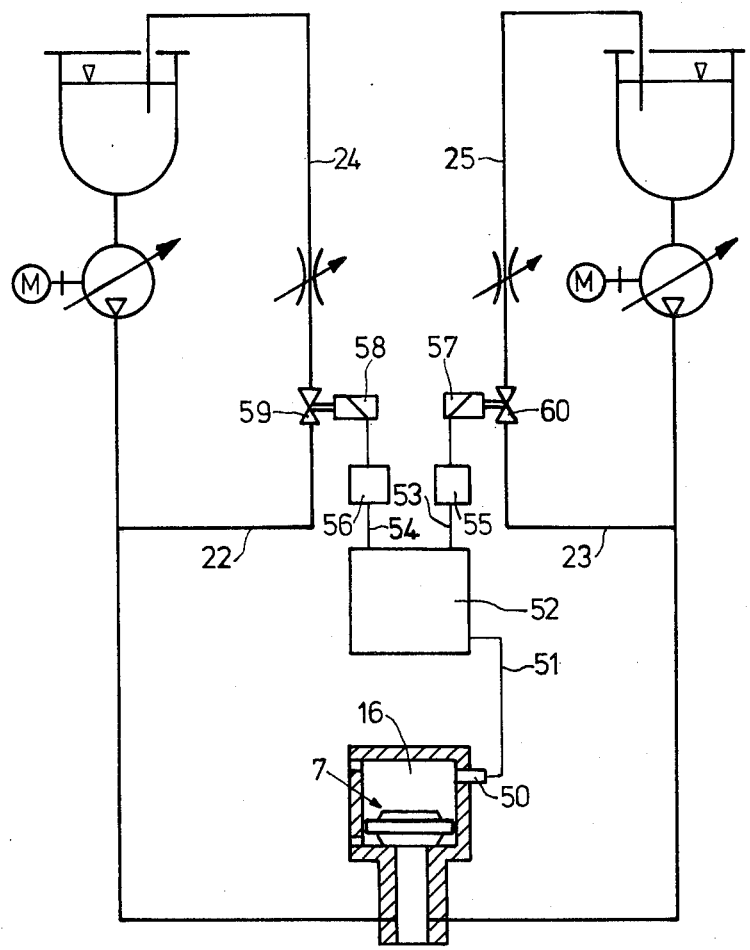
FIG. 2 represents an apparatus according to a second embodiment, in which the shut-off devices are positively controlled by the control device by way of an electronic system.

The apparatus shown in FIG. 2 is substantially similar in construction and mode of operation to that shown in FIG. 1 and the description will therefore be confined to those parts which are different. Identical parts are therefore as far as possible given the same reference numerals as in FIG. 1.

The control device 7 has no rearward extension. Instead, an electronic proximity switch 50 which switches without contact extends into the hydraulic chamber 16. The proximity switch 50 used was a product manufactured by SELECTRON LYSS AG, Industrielle Elektronik, CH-3250 Lyss, as described in Catalogue K 78 of the said Company under the title "SELEPROX R Annäherungsschalter". An impulse lead 51 connects the proximity switch 50 to an ordinary commercial impulse convertor 52. Impulse leads 53,54 extend by way of time delay elements 55,56 to controlled elements 57,58 of the shut-off devices 59,60 which are situated in the return lines, between the sections 22,24 and 23,25. The shut-off devices with control elements used are directional control valves, model WG S2-3 shown in the publication 5000 (March 1971) of HAWE, Heilmeier & Weinheim, Neumarkter Strasse 26, D-8000 Munich 80.

Both impulse leads 53,54 may contain time delay elements 55,56. Although this is basically unnecessary, it does provide the operators with a wider range of variation and correction.

The features by which the apparatus of FIG. 2 differs from that of FIG. 1 in its mode of operation are as follows: When the control device 7 is switched to "mixing", the proximity switch 50 receives the signal and transmits the switching impulse to the impulse convertor 52 by way of the impulse lead 51. The convertor 52 immediately transmits the impulse as a switching command to the time delay elements 55,56 by way of the impulse leads 53,54. The element 56 is associated with the metering system for the more highly viscous component. It is set at "zero" so that it transmits the switching control without delay to the control element 58 which then immediately closes the shut-off device 59. The time delay element 55 for the metering system of the less viscous component may delay the switching command (e.g. by 0.05 seconds) before transmitting it to the control element 57 of the shut-off device 60 which will then close later than the shut-off device 59 by the aforesaid time interval. The more inert, viscous component and the more rapidly moving, less viscous component may therefore both be injected into the mixing chamber at the same time.

When the control device 7 switches the system to the "position of rest" or circulation, the proximity switch 50 receives this impulse and transmits it so that the shut-off devices 59,60 are switched back in analogous manner.

What is claimed is:

1. Apparatus for the preparation of a reaction mixture, from fluid components, comprising storage tanks, feed pipes leading from said storage tanks to a mixing head via metering pumps and opening into a mixing chamber via injection apertures, said mixing chamber formed by the bore of a housing, a control piston displaceable within said bore and being capable of blocking flow through said apertures, return lines branching off upstream of said apertures and leading up to said storage tanks, and a shut-off means for stopping the flow of said material through at least one of said return lines, the activation of said shut-off means being dependent upon the position of said control piston within said bore.

2. The apparatus of claim 1, characterized in that a shut-off means is provided in each return line.

3. The apparatus of claim 1, characterized in that said shut-off means is a rearward extension of the control piston, said rearward extension being provided with at least one channel, said channel being situated such that when said control piston blocks said apertures, said channel connects the inflowing and outflowing sections of the return lines.

4. The apparatus of claim 3, characterized in that a seal is provided between the ranges of displacement of said channels.

5. The apparatus of claim 1, characterized in that said shut-off means, being provided with a control element, is arranged in at least one return line and in that said shut-off means consist of an electronic proximity switch which is activated by the position of control piston and which is connected to an impulse convertor which communicates with the control element.

6. The apparatus of claim 5, characterized in that a time delay element is arranged between the impulse convertor and the control element.

* * * * *